US011329790B2

(12) United States Patent
Abdelghaffar et al.

(10) Patent No.: US 11,329,790 B2
(45) Date of Patent: May 10, 2022

(54) BANDWIDTH PART FULL-DUPLEX COMMUNICATION TECHNIQUES

(71) Applicant: QUALCOMM Incorporated, San Diego, CA (US)

(72) Inventors: Muhammad Sayed Khairy Abdelghaffar, San Jose, CA (US); Krishna Kiran Mukkavilli, San Diego, CA (US); Naga Bhushan, San Diego, CA (US); Joseph Binamira Soriaga, San Diego, CA (US); Tingfang Ji, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/910,431

(22) Filed: Jun. 24, 2020

(65) Prior Publication Data

US 2020/0403759 A1 Dec. 24, 2020

Related U.S. Application Data

(60) Provisional application No. 62/865,856, filed on Jun. 24, 2019.

(51) Int. Cl.
*H04L 5/00* (2006.01)
*H04L 5/14* (2006.01)
(Continued)

(52) U.S. Cl.
CPC ......... *H04L 5/0092* (2013.01); *H04B 17/336* (2015.01); *H04L 5/0051* (2013.01);
(Continued)

(58) Field of Classification Search
CPC ....... H04L 5/0092; H04L 5/0051; H04L 5/14; H04L 25/0226; H04L 5/001;
(Continued)

(56) References Cited

U.S. PATENT DOCUMENTS

2016/0249245 A1* 8/2016 Kim ................... H04B 17/345
2017/0063503 A1* 3/2017 Liu ...................... H04L 5/0051
(Continued)

FOREIGN PATENT DOCUMENTS

WO WO-2017111905 A1 * 6/2017 ............... H04L 5/14

OTHER PUBLICATIONS

International Search Report and Written Opinion—PCT/US2020/039316—ISA/EPO—dated Sep. 18, 2020.

*Primary Examiner* — Hardikkumar D Patel
(74) *Attorney, Agent, or Firm* — Qualcomm Incorporated

(57) ABSTRACT

Various designs for implementing bandwidth part (BWP) full-duplex (FD) are discussed. A base station serving a plurality of user equipments (UEs) over a component carrier bandwidth (CC BW) receives a reference signal from a UE while transmitting downlink traffic to another UE over a part of the CC BW. The base station determines, based on the reference signal, a level of interference on transmissions over the part of the CC BW, and, based at least in part on interference cancelation capabilities of the base station and the level of interference, at least one portion of the CC BW for full-duplex operations. The base station activates full-duplex operations for the at least one portion of the CC BW, which includes receiving from the UE while transmitting to another UE over the same portion of the CC BW. Other aspects and features are also claimed and described.

30 Claims, 12 Drawing Sheets

(51) Int. Cl.
*H04W 72/08* (2009.01)
*H04L 25/02* (2006.01)
*H04B 17/336* (2015.01)
*H04W 72/04* (2009.01)

(52) U.S. Cl.
CPC ............ *H04L 5/14* (2013.01); *H04L 25/0226* (2013.01); *H04W 72/0453* (2013.01); *H04W 72/082* (2013.01); *H04L 5/001* (2013.01)

(58) Field of Classification Search
CPC . H04L 25/0228; H04L 5/0062; H04L 5/0094; H04L 5/0048; H04L 5/0037; H04L 5/16; H04L 5/1438; H04L 5/143; H04L 5/1461; H04L 27/2646; H04B 17/336; H04B 17/345; H04W 72/0453; H04W 72/082; H04W 52/143; H04W 52/146; H04W 52/14; H04W 28/0236; H04W 72/0413; H04W 72/042; H04W 56/001; H04W 56/0045
See application file for complete search history.

(56) References Cited

U.S. PATENT DOCUMENTS

| | | |
|---|---|---|
| 2017/0257184 A1 | 9/2017 | Stirling-Gallacher et al. |
| 2018/0020457 A1 | 1/2018 | Noh et al. |
| 2018/0091284 A1 | 3/2018 | Min et al. |

\* cited by examiner

BANDWIDTH PART FULL-DUPLEX COMMUNICATION TECHNIQUES

CROSS-REFERENCE TO RELATED APPLICATIONS

This application claims the benefit of and priority to U.S. Provisional Patent Application No. 62/865,856, entitled, "BANDWIDTH PART FULL-DUPLEX," filed on Jun. 24, 2019, which is expressly incorporated by reference herein in its entirety as if fully set forth below and for all applicable purposes.

TECHNICAL FIELD

Aspects of the present disclosure relate generally to wireless communication systems, and more particularly, to full-duplex operations in a wireless communication system. Certain embodiments of the technology discussed below can enable and provide mechanisms for enabling full-duplex operations for at least a portion or part of a component carrier bandwidth.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a base station serving a plurality of UEs over a component carrier bandwidth (CC BW), a reference signal from at least one UE of the plurality of UEs. The reference signal is received while the base station is transmitting downlink traffic to at least one other UE over at least a part of the CC BW. The method may also include determining, based on the reference signal, a level of interference on transmissions between the base station and the at least one UE over the at least a part of the CC BW, determining, based at least in part on interference cancelation capabilities of the base station and the determined level of interference, at least one portion of the CC BW for full-duplex operations, and activating full-duplex operations for the at least one portion of the CC BW. The activating full-duplex operations for the at least one portion of the CC BW includes enabling uplink reception from the at least one UE over the at least one portion of the CC BW while transmitting downlink traffic to the at least one other UE over the at least one portion of the CC BW. The at least one UE may, for example, be a first set of UEs of the plurality of UEs. The first set of UEs may, for example, include one or more UEs of the plurality of UEs served by the base station. The at least one other UE may, for example, be a second set of UEs of the plurality of UEs. The second set of UEs may, for example, include one or more UEs of the plurality of UEs served by the base station.

In an additional aspect of the disclosure, a method of wireless communication includes receiving, by a UE, from a base station serving a plurality of UEs including the UE over a CC BW, a request for a reference signal, generating the reference signal to be received from the UE by the base station while the base station is transmitting downlink traffic to at least one other UE over at least a part of the CC BW, receiving, from the base station, downlink control information including an indication of at least one portion of the CC BW activated for full-duplex operations between the base station and the UE, and transmitting, by the UE, uplink traffic to the base station over the at least one portion of the CC BW. The uplink traffic from the UE is received by the base station while the base station simultaneously transmits downlink information to at least another UE over the at least one portion of the CC BW.

In an additional aspect of the disclosure, an apparatus configured for wireless communication includes means for receiving, by a base station serving a plurality of UEs over a CC BW, a reference signal from at least one UE of the plurality of UEs. The reference signal is received while the base station is transmitting downlink traffic to at least one other UE over at least a part of the CC BW. The apparatus may further include means for determining, based on the reference signal, a level of interference on transmissions between the base station and the at least one UE over the at least a part of the CC BW, means for determining, based at least in part on interference cancelation capabilities of the base station and the determined level of interference, at least one portion of the CC BW for full-duplex operations, and means for activating full-duplex operations for the at least one portion of the CC BW. The means for activating full-duplex operations for the at least one portion of the CC BW include means for enabling uplink reception from the at least one UE over the at least one portion of the CC BW while transmitting downlink traffic to the at least one other UE over the at least one portion of the CC BW.

In an additional aspect of the disclosure, an apparatus configured for wireless communication includes means for receiving, by a UE, from a base station serving a plurality of UEs including the UE over a CC BW, a request for a reference signal, means for generating the reference signal to be received from the UE by the base station while the base station is transmitting downlink traffic to at least one other UE over at least a part of the CC BW, means for receiving, from the base station, downlink control information including an indication of at least one portion of the CC BW activated for full-duplex operations between the base station and the UE, and means for transmitting, by the UE, uplink traffic to the base station over the at least one portion of the CC BW. The uplink traffic from the UE is received by the base station while the base station simultaneously transmits downlink information to at least another UE over the at least one portion of the CC BW.

In an additional aspect of the disclosure, a non-transitory computer-readable medium having program code recorded thereon. The program code is executable by a computer for causing the computer to receive, by a base station serving a plurality of UEs over a CC BW, a reference signal from at least one UE of the plurality of UEs. The reference signal is received while the base station is transmitting downlink traffic to at least one other UE over at least a part of the CC BW. The program code may be further executable to determine, based on the reference signal, a level of interference on transmissions between the base station and the at least one UE over the at least a part of the CC BW, determine, based at least in part on interference cancelation capabilities of the base station and the determined level of interference, at least one portion of the CC BW for full-duplex operations, and activate full-duplex operations for the at least one portion of the CC BW. Activating full-duplex operations for the at least one portion of the CC BW includes enabling uplink reception from the at least one UE over the at least one portion of the CC BW while transmitting downlink traffic to the at least one other UE over the at least one portion of the CC BW.

In an additional aspect of the disclosure, a non-transitory computer-readable medium having program code recorded thereon. The program code is executable by a computer for causing the computer to receive, by a UE, from a base station serving a plurality of UEs including the UE over a CC BW, a request for a reference signal, generate the reference signal to be received from the UE by the base station while the base station is transmitting downlink traffic to at least one other UE over at least a part of the CC BW, receive, from the base station, downlink control information including an indication of at least one portion of the CC BW activated for full-duplex operations between the base station and the UE, and transmit, by the UE, uplink traffic to the base station over the at least one portion of the CC BW. The uplink traffic from the UE is received by the base station while the base station simultaneously transmits downlink information to at least another UE over the at least one portion of the CC BW In an additional aspect of the disclosure, an apparatus configured for wireless communication is disclosed. The apparatus includes at least one processor, and a memory coupled to the processor. The processor is configured to receive, by a base station serving a plurality of UEs over a CC BW, a reference signal from at least one UE of the plurality of UEs. The reference signal is received while the base station is transmitting downlink traffic to at least one other UE over at least a part of the CC BW. The processor may be further configured to determine, based on the reference signal, a level of interference on transmissions between the base station and the at least one UE over the at least a part of the CC BW, determine, based at least in part on interference cancelation capabilities of the base station and the determined level of interference, at least one portion of the CC BW for full-duplex operations, and activate full-duplex operations for the at least one portion of the CC BW. Activating full-duplex operations for the at least one portion of the CC BW includes enabling uplink reception from the at least one UE over the at least one portion of the CC BW while transmitting downlink traffic to the at least one other UE over the at least one portion of the CC BW.

In an additional aspect of the disclosure, an apparatus configured for wireless communication is disclosed. The apparatus includes at least one processor, and a memory coupled to the processor. The processor is configured to receive, by a UE, from a base station serving a plurality of UEs including the UE over a CC BW, a request for a reference signal, generate the reference signal to be received from the UE by the base station while the base station is transmitting downlink traffic to at least one other UE over at least a part of the CC BW, receive, from the base station, downlink control information including an indication of at least one portion of the CC BW activated for full-duplex operations between the base station and the UE, and transmit, by the UE, uplink traffic to the base station over the at least one portion of the CC BW. The uplink traffic from the UE is received by the base station while the base station simultaneously transmits downlink information to at least another UE over the at least one portion of the CC BW.

In some examples of the method, the apparatuses, and the article including non-transitory computer-readable medium described herein, the at least one reference signal includes a sounding reference signal (SRS) received from each UE of a first set of UEs. In some examples, each UE of the first set of UEs is configured to generate the SRS by wideband sounding across one or more ports of the UE.

In some examples of the method, the apparatuses, and the article including non-transitory computer-readable medium described herein, full-duplex operations may include receiving at least one of uplink control information, an uplink random access channel, or uplink data from at least one UE of a first set of UEs. In some examples, full-duplex operations may further include transmitting at least one of downlink control information and downlink data to at least one UE of a second set of UEs.

In some examples of the method, the apparatuses, and the article including non-transitory computer-readable medium described herein, interface cancelation capabilities of a base station may be based on at least one of a full-duplex bandwidth within the CC BW or a full-duplex interference cancelation requirement.

In some examples of the method, the apparatuses, and the article including non-transitory computer-readable medium described herein, a full-duplex bandwidth within the CC BW is an overlapped bandwidth of a downlink transmission bandwidth and an uplink reception bandwidth at the base station.

In some examples of the method, the apparatuses, and the article including non-transitory computer-readable medium described herein, a full-duplex interference cancellation requirement may be based on a downlink transmit power, an uplink transmit power, an isolation between antennas of a base station, a target uplink signal to interference and noise ratio ($SINR_{UL}$), and a path-loss (PL) of at least one UE of a second set of UEs.

In some examples of the method, the apparatuses, and the article including non-transitory computer-readable medium described herein, a first set of UEs may include multiple UEs. In some examples, determination of at least one portion of the CC BW for full-duplex operation may include one of determining a different portion of the CC BW for full-duplex operations for each UE of the first set of UEs or determining a single portion of the CC BW for full-duplex operations for at least two UEs of the first set of UEs.

In some examples of the method, the apparatuses, and the article including non-transitory computer-readable medium described herein, transmitting downlink traffic to a second set of UEs over at least one portion of CC BW includes transmitting downlink traffic in an equal, smaller, or larger portion of the at least one portion of the CC BW over which uplink traffic is received from a first set of UEs.

In some examples of the method, the apparatuses, and the article including non-transitory computer-readable medium described herein, a determined portion of a CC BW may be one of: centered on the CC BW, at one of the edges of the CC BW, or defined by one or more sets of contiguous Resource Block (RB) allocations based on an index of a first RB and a number of RBs in the set.

In some examples of the method, the apparatuses, and the article including non-transitory computer-readable medium described herein, a requested reference signal may be a sounding reference signal (SRS), and generation of the SRS may include performing a wideband sounding across one or more ports of the UE.

In some examples of the method, the apparatuses, and the article including non-transitory computer-readable medium described herein, a UE is be configured for half-duplex operations when performing one or more steps.

In some examples of the method, the apparatuses, and the article including non-transitory computer-readable medium described herein, an indication of at least one portion of a CC BW activated for full-duplex operations between the base station and the UE, received by a UE, is based on interference cancelation capabilities of the base station.

In some examples of the method, the apparatuses, and the article including non-transitory computer-readable medium described herein, receipt, by a base station serving a plurality of UEs over a CC BW, of at least one reference signal from a first set of UEs of the plurality of UEs may be an optional step. In some examples, the base station may activate full-duplex operations as described herein before or without receiving at least one reference signal from a first set of UEs of the plurality of UEs.

In some examples of the method, the apparatuses, and the article including non-transitory computer-readable medium described herein, a base station serving a plurality of UEs over a CC BW may receive at least one reference signal from a first set of UEs of the plurality of UEs. The reference signal may, for example, be received while the base station is transmitting downlink traffic to a second set of UEs of the plurality of UEs over at least a part of the CC BW. However, in some examples, instead of performing separate steps of determining, based on the reference signal, a level of interference on transmission between the base station and the first set of UEs over the at least part of the CC BW and determining, based at least in part on interference cancellation capabilities of the base station and the determined level of interference, at least one portion of the CC BW for full-duplex operations, the base station may determine, based on at least one of a received reference signal and interference cancellation capabilities of the base station, at least one portion of the CC BW for full-duplex operations. Thus, in some examples, the steps of determining a level of interference and determining at least one portion of the CC BW for full-duplex operations may be performed in a single step.

In some examples of the method, the apparatuses, and the article including non-transitory computer-readable medium described herein, steps of generating, by the UE, the reference signal to be received by the base station while the base station is transmitting downlink traffic to at least one other UE of the plurality of UEs over at least a part of the CC BW and receiving, from the base station, downlink control information including an indication of at least one portion of the CC BW activated for full-duplex operations between the base station and the UE may be optional. In some examples, a UE may perform steps of receiving, from a base station serving a plurality of UEs including the UE over a CC BW, a request for a reference signal and transmitting, by the UE uplink traffic to the base station over at least one portion of the CC BW, where the uplink traffic from the UE is received by the base station while the base station simultaneously transmits downlink information to at least one other UE over the at least one portion of the CC BW without performing one or both of the steps of generating a reference signal and receiving downlink control information.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
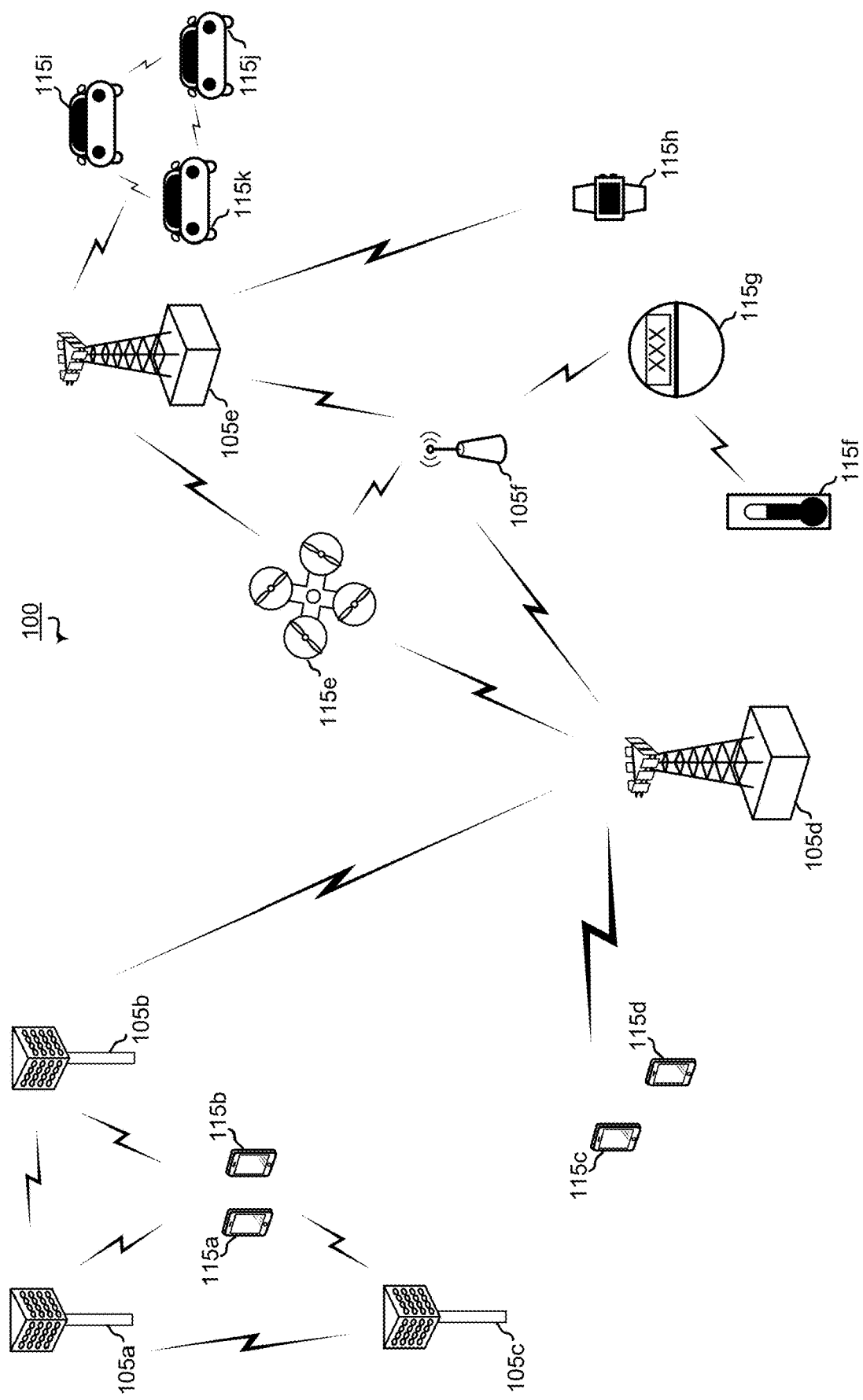
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
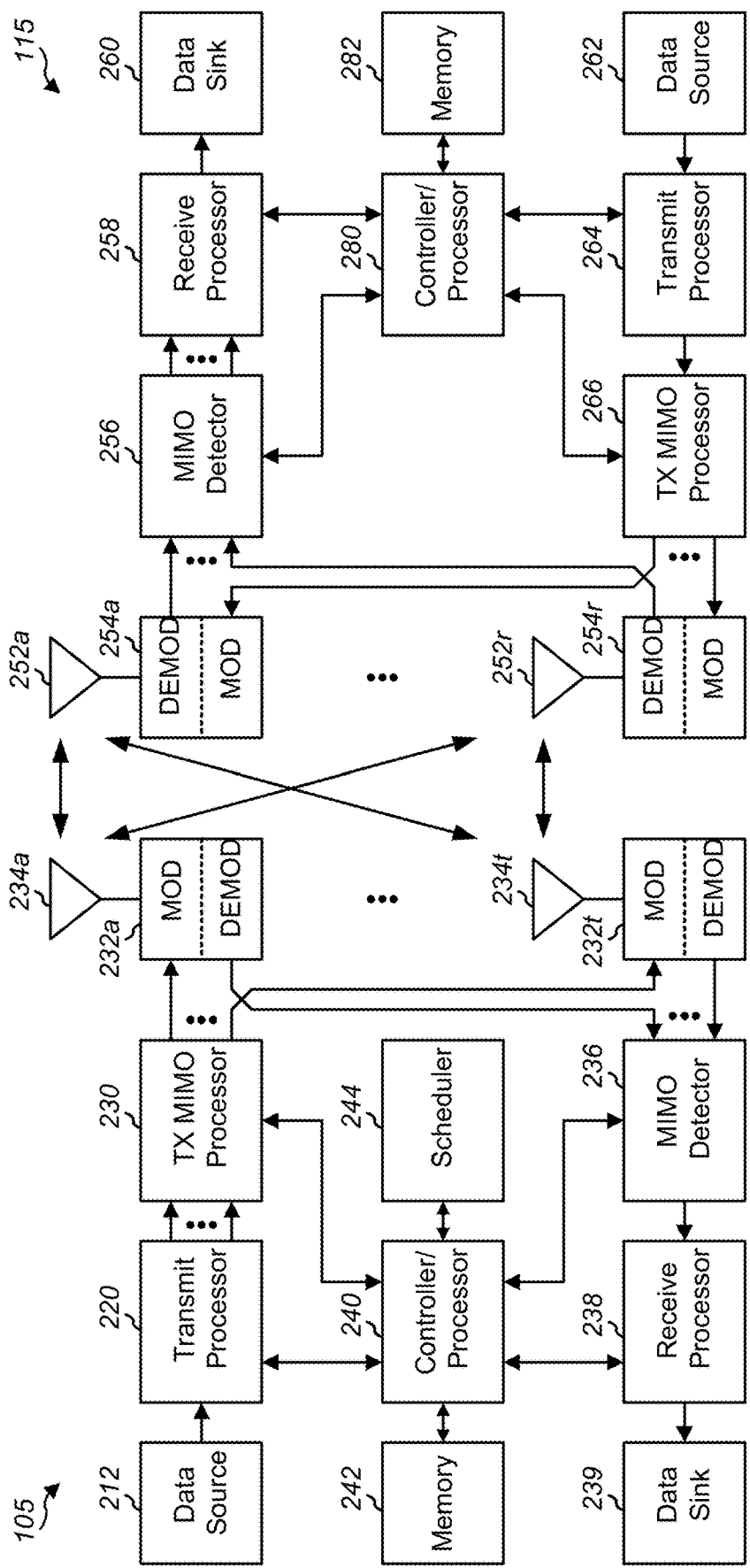
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 6A and 6B, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, to allow network operating entities use of the full designated shared spectrum, and to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Spectrum access may be afforded in several manners. Access to the shared spectrum and the arbitration of time resources among different network operating entities may be centrally controlled by a separate entity, autonomously determined by a predefined arbitration scheme, or dynamically determined based on interactions between wireless nodes of the network operators. In other scenarios, additionally or alternatively, spectrum access may be managed by one or more independent network nodes, may be requested by one or more network nodes, and/or network nodes may communicate with or without formal access grants.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In typical wireless communication systems, TDD may be implemented based on a half-duplex communication, in which a node is either receiving or transmitting, but not both, at a given time. In these cases, a base station and an UE operating in half-duplex may communicate with each other, but not simultaneously. For example, a base station may transmit on the downlink to a UE at a particular time, but may not receive on the uplink from the UE at the same time, or the base station may receive on the uplink from the UE but may not transmit on the downlink at the same time. Similarly, a UE may transmit on the uplink to a base station at a particular time, but may not receive on the downlink from the base station at the same time, or the UE may receive on the downlink from the base station but may not transmit on the uplink at the same time. This half-duplex communication approach, while allowing bi-directional communication between a base station and a UE, suffers from a number of issues. For example, half-duplex creates delays, as the base station and nodes have to wait for their respective turns to transmit or receive. As such, half-duplex communication is not greatly suited for low-latency requirement applications, such as in ultra-reliable low-latency communication (URLLC) applications. In addition, half-duplex communication is typically implemented using an uplink channel and a downlink channel, but given that the nodes do not transmit and receive at the same time, only one channel may be used at a particular time, thereby reducing the transmission capacity of the system.

Full-duplex communication allows simultaneous transmission and reception between nodes in TDD implementations. For example, full-duplex may allow for simultaneous uplink reception and downlink transmission by a base station, and/or simultaneous uplink transmission and downlink reception by a UE in TDD systems. As such, enabling full-duplex communication may increase a system's throughput and may reduce latency. For example, full-duplex may double the capacity of a system over half-duplex, as two parallel links with same bandwidth (e.g., uplink and downlink) may be used. In addition, full-duplex communication may reduce a system's latency, as the transmission links may be configured to be "always-on," which may remove the node's having to wait to switch from receiving to transmitting. For example, in URLLC applications, an always-on uplink may be beneficial and may allow the system to provide URLLC control channels that are always on and for which latency is greatly reduced.

Figure 3:
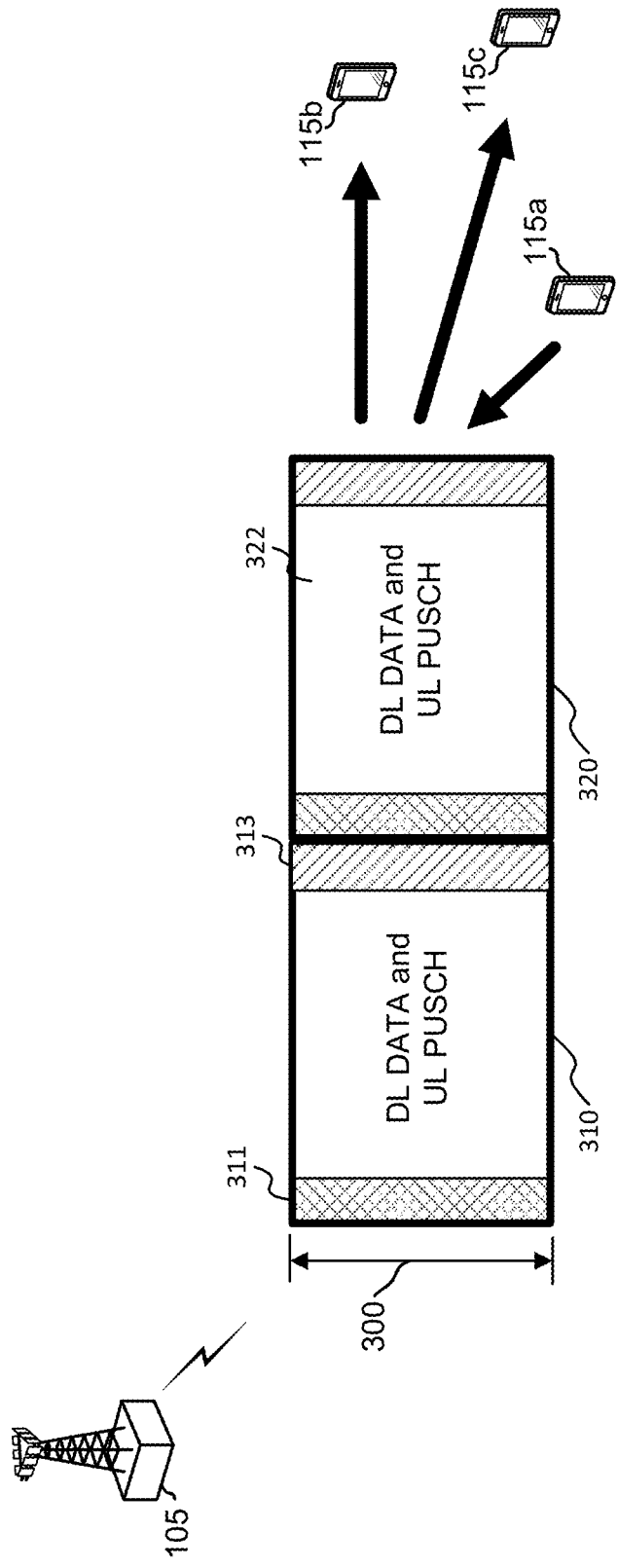
FIG. 3 is a block diagram illustrating an example of a full-duplex implementation of a base station in accordance with embodiments of the present disclosure.

FIG. 3 shows a block diagram illustrating an example of a full-duplex implementation of a base station in accordance with embodiments of the present disclosure. As seen in FIG. 3, full-duplex may be enabled for a base station, e.g., base station 105, serving at least one UE (e.g., UEs 115a-c) over component carrier bandwidth (CC BW) 300. In this full-duplex implementation, base station 105 may be configured to transmit downlink data to at least one of the UEs while simultaneously receiving uplink data from at least one other of the UEs. For example, in symbol 311 of slot 310, base station 105 may transmit downlink control information to UEs 115a-c. The downlink control information may include uplink grants for a specific UE, or UEs, specifying slots/symbols in which the specific UE(s) may transmit uplink data to base station 105, and may include downlink grants for a specific UE, or UEs, specifying slots/symbols in which the specific UE(s) may receive downlink data from the base station 105. For example, the downlink control information transmitted to UEs 115a-c in symbol 310 may specify that UE 115a is to transmit PUSCH to base station 105 at symbols 322 of slot 320, and/or uplink control information at symbol 313 of slot 310. The downlink control information may also specify that UEs 115b and 115c are to receive downlink data, such as PDSCH, at symbols 322 of slot 320. In this manner, the downlink control information in symbol 311 may specify which UEs may be in uplink mode (e.g., UE 115a) and which UEs may be in downlink mode (e.g., UEs 115b and 115c) during a same period of time (e.g., during symbol 313 and/or symbols 322). During symbol 313 and symbols 322, base station 105 may simultaneously transmit and receive data to/from UEs 115a-c, based on the downlink control information, over CC BW 300.

Enabling full-duplex operations for a base station may include configuration of the base station to transmit downlink data to some of the served UEs, while simultaneously receiving uplink transmission from some of the other served UEs. However, a number of challenges exist in implementation of full-duplex operations. For example, implementing full-duplex may impact the interference cancellation (IC) capabilities of a base station.

Figure 4:
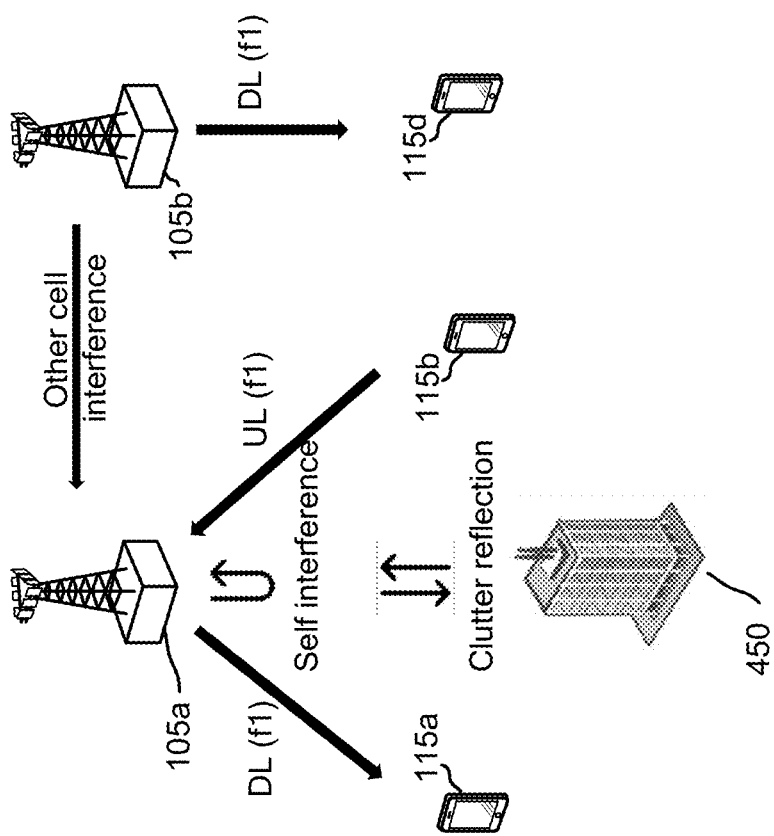
FIG. 4. is a block diagram illustrating examples of interference on wireless communications on a system implemented according to some embodiments of the present disclosure.

Interference on reception or transmission of a signal may be caused by various sources. FIG. 4 is a block diagram illustrating examples of interference on wireless communications on a system implemented according to some embodiments of the present disclosure. Base station 105a may be in full-duplex communication with UEs 115a and 115b. For example, base station 105a may be simultaneously transmitting downlink data to UE 115a over frequency bandwidth f1 and receiving uplink data from UE 115b over the same frequency bandwidth f1. One source of interference on the wireless communication operations by base station 105a may be clutter reflections. For example, the transmissions from base station 105a (e.g., downlink transmissions) may be reflected off objects (e.g., buildings, vehicle, landmarks, etc.), such as object 450, and these reflections may reach back to base station 105a and may interfere with the transmissions of the uplink signals from UE 115b to base station 105a. In this case, the uplink signal received by base station 105a may be victim to the clutter reflections.

Another source of interference may come from other cells or base stations. For example, neighboring base station 105b may be transmitting downlink signals to UE 115d. These downlink signals may cause interference on the transmissions of the uplink signals from UE 115b to base station 105a, similar to how the clutter reflections interfere with the uplink transmissions from UE 115b. In some implementations, interference from other cells may be mitigated by applying a MAC procedure.

Yet another source of interference may be self-interference caused by the full-duplex operations of the base station. For example, simultaneous transmission and reception by the base station may cause self-interference from the transmitter chain (Tx) to the receiver chain (Rx) of the base station. In this case, the downlink signals transmitted from the Tx may interfere with the uplink signals received at the Rx, which may be received at the same time in full-duplex operations.

Figure 5:
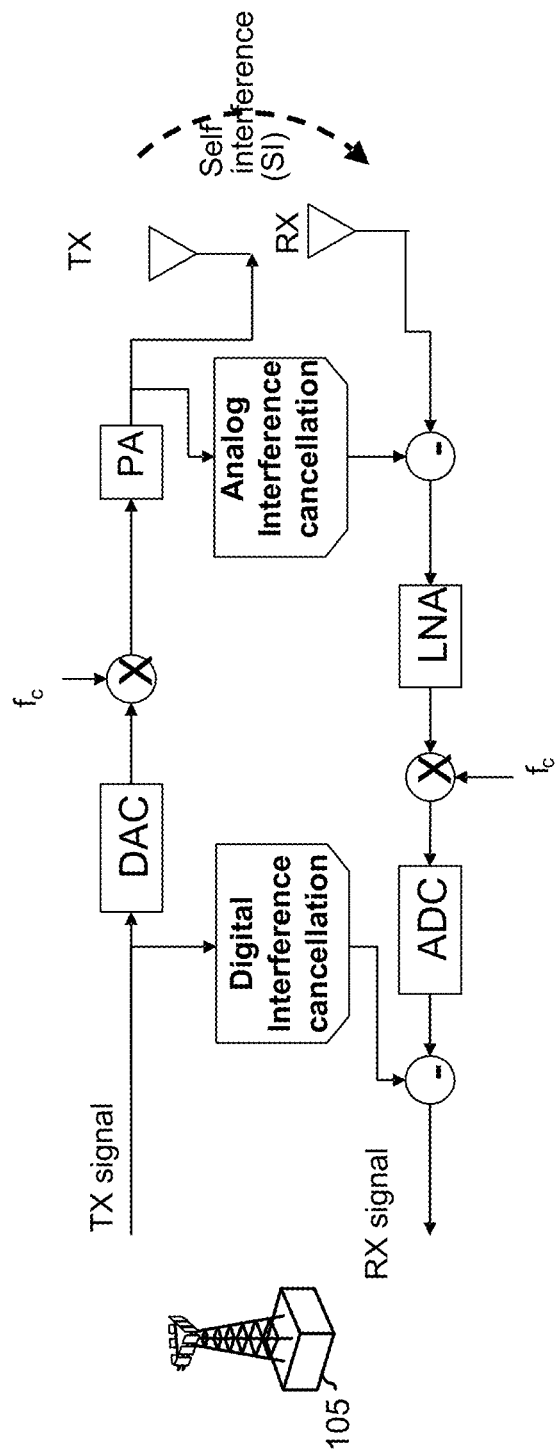
FIG. 5 is a block diagram illustrating examples of interface cancelation capabilities of a base station implemented according to some embodiments of the present disclosure.

Thus, to implement full-duplex communication, a base station may be configured to apply IC to address the above challenges. FIG. 5 is a block diagram illustrating examples of interface cancelation capabilities of a base station implemented according to some embodiments of the present disclosure. The IC capabilities of a base station (e.g., base station 105) may include self-interference cancelation, analog IC, and digital IC. Self-interference cancelation may include applying antenna isolation techniques to the full-duplex implementation in order to reduce the downlink signal at the Tx. However, in full-duplex implementation, the antenna isolation between the Tx and Rx antennas may be in the order of 100 dB or more to avoid self-leakage desense of the receiver, which may increase the complexity required for the IC capabilities of the base station.

Analog IC may include using the output of a power amplifier (PA) in the Tx chain to cancel the interference from the downlink transmission on the received uplink signal before the uplink signal is fed into the low noise amplifier (LNA) of the Rx chain. Knowledge of the transmitted downlink signal by the base station allows the cancelation of the interfering signal from the downlink signal before the LNA. In addition, residual interference may be canceled using digital IC at the baseband. In this case, the digital downlink signal may be fed into the output of an analog-to-digital converter (ADC) of the Rx chain, which may allow for the residual interference, after the analog IC, to be removed.

The implementation of IC by the base station requires a certain level of complexity (e.g., hardware complexity) that may limit the IC capabilities of the base station. For example, a base station may have a limited IC complexity, e.g., may have a limited amount of hardware to assign to various IC capabilities. In this case, how much of the interference can be canceled may depend on the IC capabilities of the base station given the available and allocated complexity. For example, for a given hardware complexity of a base station, the IC capabilities of the base station with respect to a particular interference (e.g., type of interference, source of interference, victim signal, etc.) may be determined. In some cases, however, the IC capability of a base station, such as base station 105, for a given complexity, may depend on the overlapped bandwidth between the victim uplink signal and the aggressor downlink signal. For example, where the downlink bandwidth is 100 MHz, and the uplink bandwidth is 30 MHz of the CC BW, the overlap may be determined to be 30 MHz. In these cases, as the overlap between the victim uplink signal and the aggressor downlink signal increases, the IC capabilities of the base station (e.g., the amount of interference that the base station may be able to mitigate based on the given complexity) may decrease. For example, the analog IC capabilities of a base station may be a certain level of IC for a particular size of BW with a particular number of taps. However, as the BW increases, the analog IC capability using the same number of taps also decreases. In order to handle the increase BW, a higher number of taps may be used, which increases the complexity required for the IC capability.

Digital IC capabilities may be based on a sampling frequency that may be used to reconstruct the baseband signal. In addition, the signal may be processed through a filter, which may have a shaping. In this case, multiple taps may be needed to reconstruct the sampling frequency. As the BW increases, a higher sampling sequencing may be necessary to be able to reconstruct the baseband signal, along with a higher number of taps, which may increase the complexity necessary for achieving the IC. In particular, the hardware complexity to reconstruct a non-linear interference digitally may depend on the sampling frequency (Fs) which may be a function of the signal bandwidth (e.g., Fs=fn(BW) and the number of filter taps, which may be a function of the signal bandwidth (e.g., #taps=fn(BW)).

As such, as the BW increases, the IC capability of the base station, given a hardware complexity, also decreases. If a higher BW is desired to be used, then the hardware complexity of the base station may need to be increased. Since the base station has a limited amount of hardware complexity available, this may present a challenge. In particular, implementing full-duplex communication may be challenging in that it may require a high level of hardware complexity to implement IC, given a base station's IC capabilities, in light of the high antenna isolation requirements and the need for analog IC and digital IC.

Various aspects of the present disclosure are directed to providing mechanisms and techniques to enable full-duplex operations in at least a portion or part of a CC BW. As used herein, bandwidth part full-duplex (BWP FD) may refer to the functionality of a base station to identify, define, reserve, select, and/or use at least one BWP of the CC BW in which the base station will enable full-duplex operations with respect to at least one UE, and where full-duplex operations may be limited to the at least one BWP. Aspects of the present disclosure provide for BWP FD techniques that may facilitate a reduction in the hardware complexity necessary for adoption of full-duplex, while enabling simultaneous uplink reception (e.g., PUCCH and/or PUSCH) and downlink transmission over the BWP identified for BWP FD.

In some wireless communication implementations, the IC capabilities of a base station may not be sufficient to allow full-duplex operations over the entire span or bandwidth of the CC BW. For example, the base station may have particular IC capabilities based on a complexity, which IC capabilities may be reduced by enabling full-duplex on the entire CC BW. In some embodiments, the reduction in IC capabilities may be determined to exceed some threshold, in which case it may be determined that the base station may not be able to handle full-duplex operations. Additionally or alternatively, enabling full-duplex over the entire CC BW may result in an increase in hardware complexity, to provide IC capabilities, that exceeds a threshold, in which it may be determined that the base station may not be able to handle full-duplex operations. By employing the BWP FD techniques of embodiments of the present disclosure, a system may be able to provide full-duplex operations that are not only responsive to the IC capabilities of a base station, but that also take into consideration the hardware complexity limits of the base station.

Figure 6B:
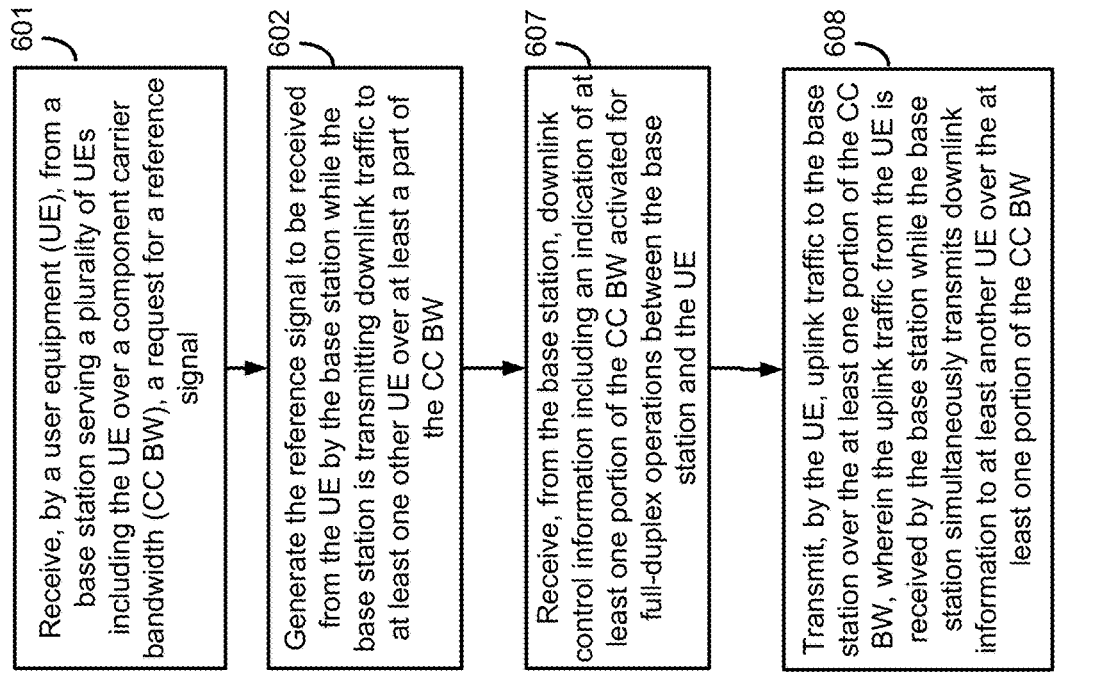
FIG. 6B is a block diagram illustrating example blocks executed by a UE to implement aspects of the present disclosure.
Figure 6A:
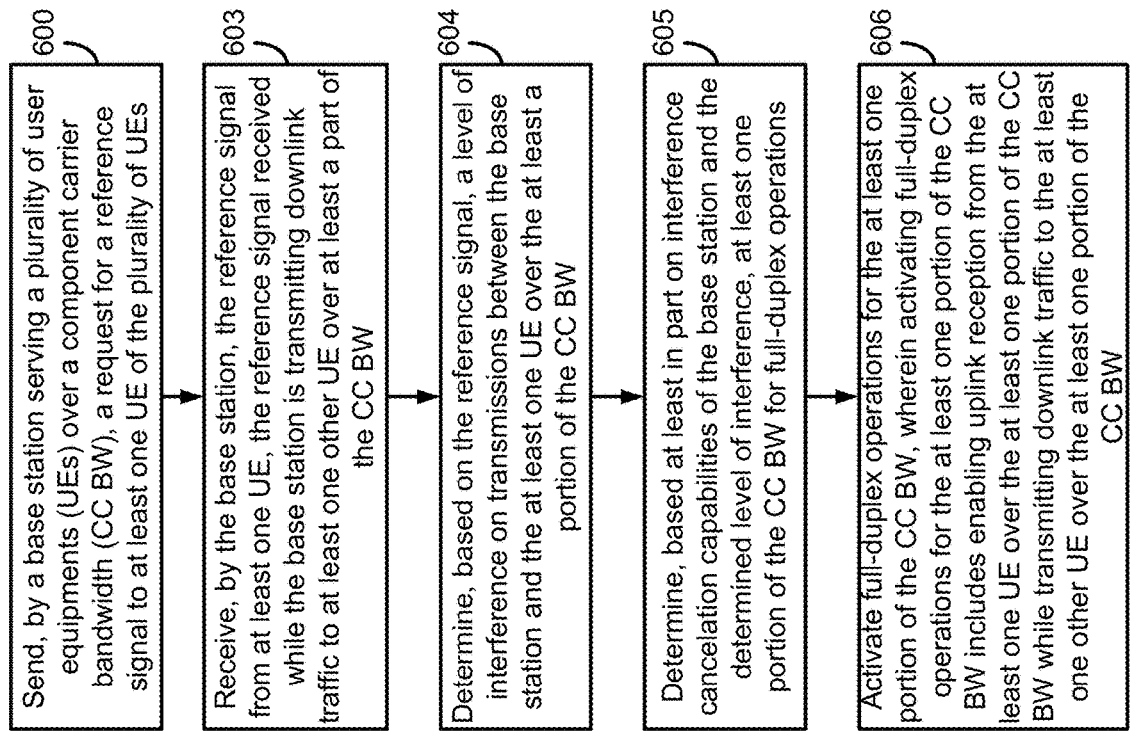
FIG. 6A is a block diagram illustrating example blocks executed by a base station to implement aspects of the present disclosure.

FIGS. 6A and 6B are block diagrams illustrating example blocks executed by a base station and a UE to implement aspects of the present disclosure. The example blocks will also be described with respect to base station 900 as illustrated in FIG. 9 and base stations 105 as illustrated in FIG. 2, and with respect to UE 1000 as illustrated in FIG. 10 and UEs 115 as illustrated in FIG. 2.

Figure 9:
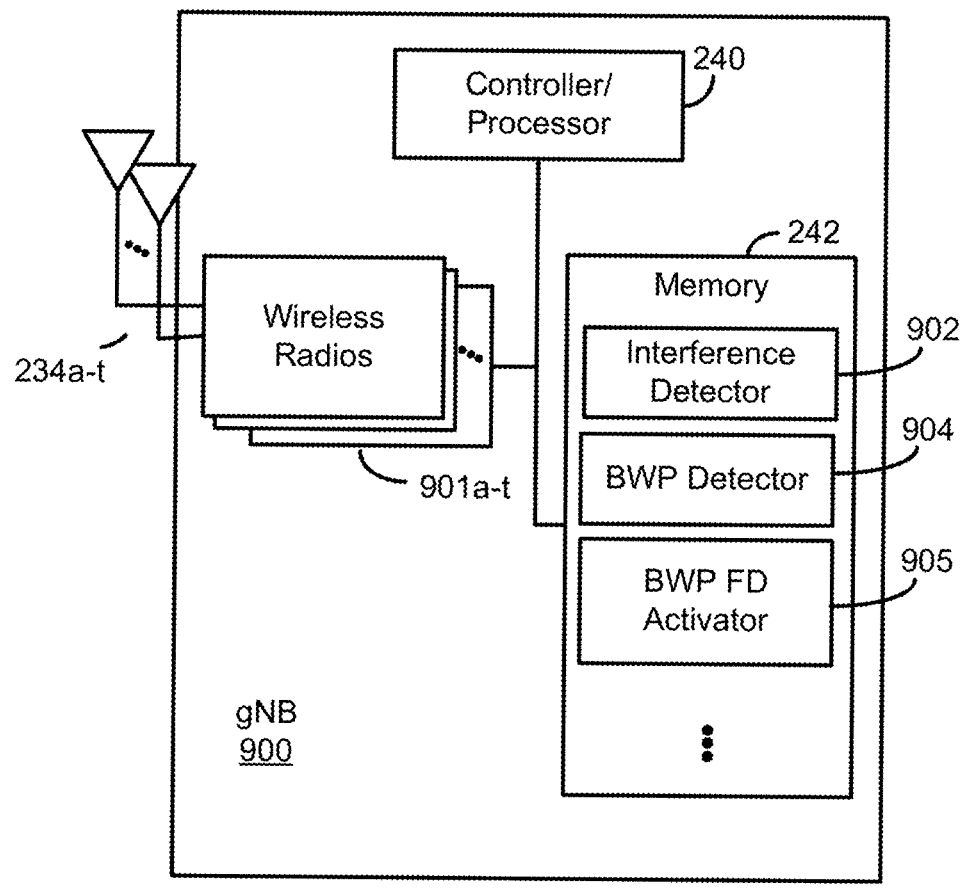
FIG. 9 is a block diagram conceptually illustrating a design of a base station configured according to some embodiments of the present disclosure.

FIG. 9 is a block diagram illustrating base station 900 configured according to one aspect of the present disclosure. Base station 900 includes the structure, hardware, and components as illustrated for gNB 105 of FIG. 2. For example, base station 900 includes controller/processor 240, which operates to execute logic or computer instructions stored in memory 242, as well as controlling the components of base station 900 that provide the features and functionality of base station 900. Base station 900, under control of controller/processor 240, transmits and receives signals via wireless radios 901a-t and antennas 234a-t. Wireless radios 901a-t include various components and hardware, as illustrated in FIG. 2 for gNB 105, including modulator/demodulators 232a-t, MIMO detector 236, receive processor 238, transmit processor 220, and TX MIMO processor 230.

Figure 10:
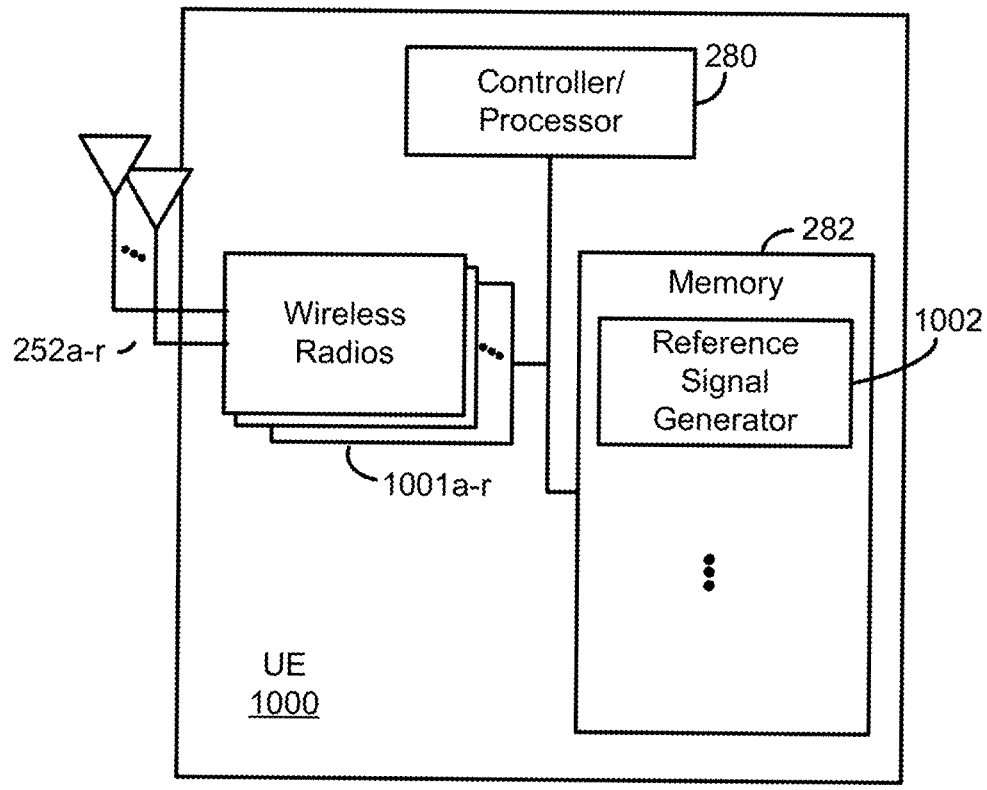
FIG. 10 is a block diagram conceptually illustrating a design of a UE configured according to some embodiments of the present disclosure.

FIG. 10 is a block diagram illustrating UE 1000 configured according to one aspect of the present disclosure. UE 1000 includes the structure, hardware, and components as illustrated for UE 115 of FIG. 2. For example, UE 1000 includes controller/processor 280, which operates to execute logic or computer instructions stored in memory 282, as well as controlling the components of UE 1000 that provide the features and functionality of UE 1000. UE 1000, under control of controller/processor 280, transmits and receives signals via wireless radios 1000a-r and antennas 252a-r. Wireless radios 1001a-r includes various components and hardware, as illustrated in FIG. 2 for UE 115, including modulator/demodulators 254a-r, MIMO detector 256, receive processor 258, transmit processor 264, and TX MIMO processor 266.

At block 600, a base station serving a plurality of UEs over a CC BW sends a request for a reference signal to at least one UE of the plurality of UEs. For example, gNB 900, under control of controller/processor 240, may transmit, via wireless radios 901a-t and antennas 234a-t, a request for a reference signal to at least one of UEs 115a-c, as shown in FIG. 3. At block 601, the at least one UE receives the request for the reference signal from the base station. For example, UE 1000 may receive, via wireless radios 1001a-r and antennas 252a-r, the request for a reference signal from base station 900.

In aspects, a request for a reference signal may be sent to one or more UEs, of the plurality of UEs being served by the base station. The base station may intend to operate in BWP FD mode with one or more of the UEs (e.g., in downlink control information). UEs identified as potential candidates for BWP FD operations may also be referred to as BWP FD UEs. Operating in BWP FD mode with the one or more UEs may be from the base station perspective, in that the base station may receive uplink transmissions from the one or more UEs while simultaneously transmitting downlink data or control information to other UEs over a portion of the CC BW, but not transmitting downlink to the one or more UEs. In other words, the one or more UEs transmitting uplink transmissions, and the other UEs receiving downlink transmissions from the base station, may operate in half-duplex mode, while the base station may operate in full-duplex mode with respect to the plurality of UEs, transmitting downlink to some UEs, and receiving uplink from other UEs. Various configurations of BWP FD operations will be discussed in more detail below.

Figure 7:
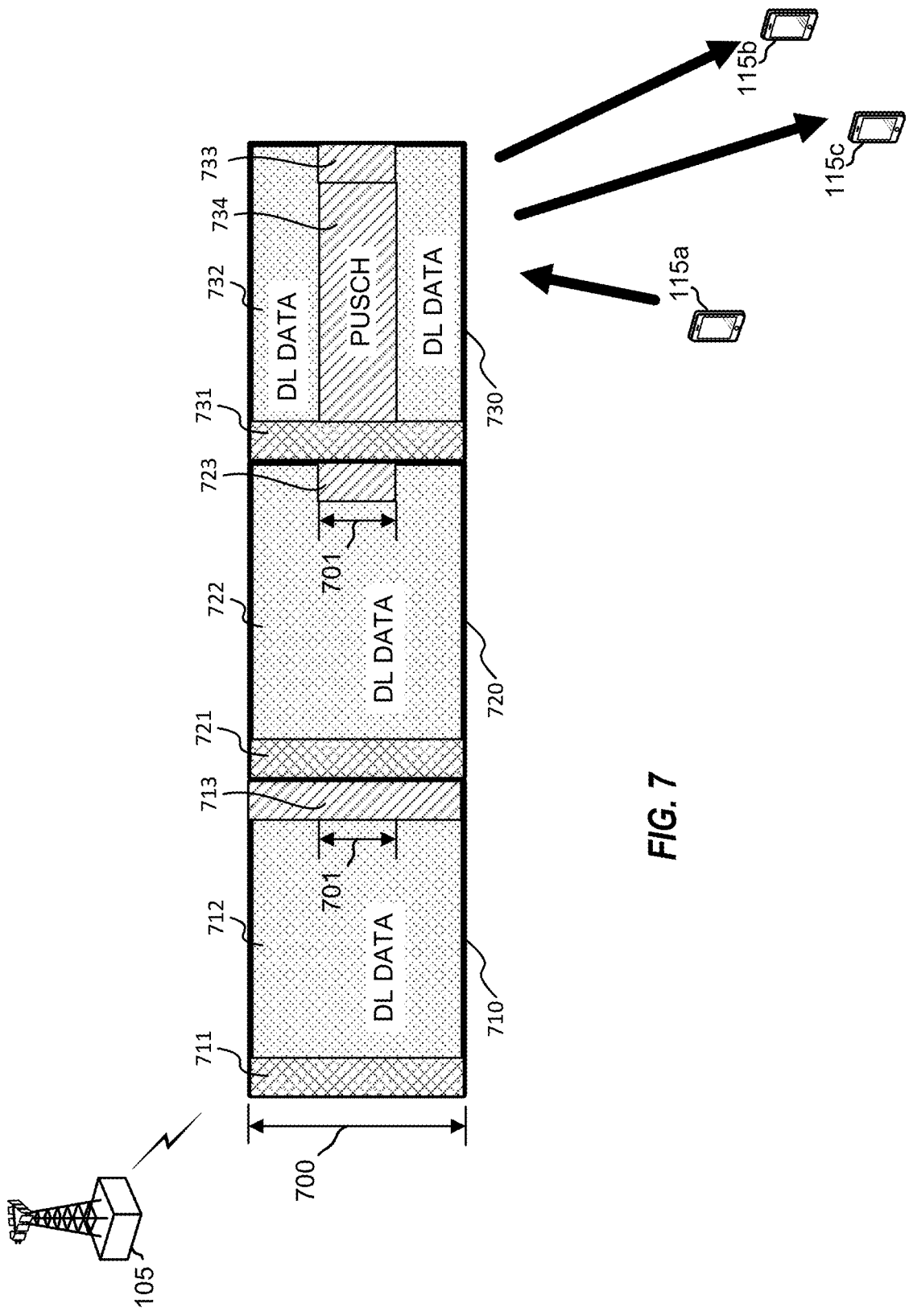
FIG. 7 is a block diagram illustrating an example of a bandwidth part full-duplex (BWP-FD) implementation in accordance with embodiments of the present disclosure.

In aspects, a request for the reference signal may include a request by a base station to the one or more UEs identified for BWP FD for a sounding reference signal (SRS). On some occasions, the request may be at or for a particular symbol of a particular slot. The particular symbol of the particular slot may be determined by the base station to be a symbol of a slot in which the base station will be transmitting on the downlink to at least one non-BWP FD UE. In this manner, the SRS may be received by the base station from the BWP FD UEs while the base station is transmitting in the downlink to the non-BWP FD UEs, which may allow the base station to sense the uplink channel in the presence of interference due to full-duplex operations (e.g., self-interference). For example, FIG. 7 shows a block diagram illustrating an example of a BWP FD implementation in accordance with embodiments of the present disclosure. In this example, base station 105 may send a request, in downlink control information sent in symbol 711 of slot 710 to BWP FD UE 115a, to SRS across the entire CC BW 700 in the last symbol 713 of slot 710. At symbol 713 of slot 710, base station 105 may also be scheduled to transmit downlink data to UEs 115b and 115c. Thus, when UE 115a generates and transmits the SRS to base station 105 at symbol 713, base station 105 may be able to sense the uplink channel with respect to UE 115a over the entire CC BW, including BWP 701, while under interference from the simultaneous reception and transmission at symbol 713.

In aspects, the SRS may be wideband, e.g., across the entire CC BW including each BW part of the CC BW. In this manner, the base station may be able to determine which portions or parts of the CC BW may have interference, the level of interference, and the type of interference. In aspects, the base station may be able to estimate the interference at every resource element level.

At block 602, the UE generates the reference signal and transmits the reference signal to the base station while the base station is transmitting downlink traffic to at least one other UE over at least a part of the CC BW. For example, UE 1000 may execute, under control of controller/processor 280, reference signal generator 1002, stored in memory 282. The execution environment of reference signal generator 1002 provides the procedural steps for generating, by the UE, the reference signal and transmitting it to the base station while the base station is transmitting downlink traffic to at least one other UE over at least a part of the CC BW.

At block 603, the base station receives the reference signal from at least one UE, the reference signal received while the base station is transmitting downlink traffic to at least one other UE over the at least a part of the CC BW. For example, gNB 900, under control of controller/processor 240, may receive, via wireless radios 901a-t and antennas 234a-t, the reference signal from UE 115a. In aspects, as noted above, the reference signal may include an SRS, and the base station may receive the SRS at the same symbols at which the base station may transmit downlink traffic to the non-BWP FD UEs, which may allow the base station to sense the uplink channel with respect to UE 115a over the entire CC BW, including every BWP of the CC BW, including the BWPs over which base station transmitted downlink traffic to non-BWP FD UEs. The at least one UE from which the reference signal is received may, for example, be a first set of UEs of a plurality of UEs served by the gNB 900. For example, the first set of UEs may include one or more UEs served by the gNB 900. In some embodiments, the base station may receive multiple reference signals from multiple UEs of the first set of UEs.

At block 604, the base station determines, based on the reference signal, a level of interference on transmissions between the base station and the at least one UE over the at least a portion of the CC BW. For example, gNB 900 may execute, under control of controller/processor 240, interference detector 902, stored in memory 242. The execution environment of interference detector 902 provides the procedural steps for determining, based on the reference signal, a level of interference on transmissions between the base station and the at least one UE over the at least a portion of the CC BW. In aspects, determining the level of interference may include sensing the uplink channel over every part of the CC BW based on the SRS sounded by the BWP FD UEs. For example, as shown in FIG. 7, base station 105, upon receiving SRS from UE 115a at symbol 713 of slot 710, base station 105 may determine, based on the SRS, a level of interference on UE 115a's uplink channel due to the downlink transmissions to UEs 115b and 115c. In aspects, base station 105 may also determine the type of interference (e.g., self-interference, reflection interference, interference from other cells, etc.). Although the present discussion is illustrated with respect to one candidate BWP FD UE 115a, in aspects, more than one candidate BWP FD UE may be identified. In these aspects, an SRS from each of the more than one candidate BWP FD UE may be received by base station 105, and may be used to determine a level of interference with respect to each respective candidate BWP FD UE of the more than one candidate BWP FD UE.

At block 605, the base station determines, based at least in part on the IC capabilities of the base station and the level of interference determined at block 604, at least one portion of the CC BW for full-duplex, e.g., BWP FD, operations. For example, gNB 900 may execute, under control of controller/processor 242, BWP detector 904, stored in memory 240. The execution environment of BWP detector 904 provides the procedural steps for determining, based at least in part on the IC capabilities of the base station and the determined level of interference, the at least one portion of the CC BW for full-duplex. In aspects, determining a single portion or multiple portions of the CC BW in which full-duplex operations may be enabled for the base station may include determining the IC capabilities of the base station with respect to the interference level associated with the BWP FD UE(s). For example, a base station's IC capabilities may be dependent on the level of interference that needs to be canceled (e.g., the size of the BW, the level of overlap between downlink/uplink, etc.). In these aspects, the base station may determine, for each candidate BWP FD UE, whether the base station's IC capabilities are sufficient to reduce the interference level on the uplink channels of a respective UE over the different portions of the CC BW. When the base station determines that the IC capabilities are sufficient to reduce the interference level on the uplink channels of a particular UE over a particular portion of the CC BW, the base station may determine that the particular portion of the CC BW may be used for full-duplex operations with respect to the particular UE, e.g., the particular portion may be enabled for receiving uplink transmissions from the particular UE while the base station may simultaneously transmit downlink traffic to other UEs over the same particular portion. For example, with respect to FIG. 7, base station 105 may determine that its IC capabilities are sufficient to reduce the interference on the uplink channel associated with UE 115a over BWP 701, as determined at bock 604, due to simultaneous downlink transmission by base station 105 to UEs 115b and 115c over the same BWP 701. In this case, base station 105 may determine that BWP 701 may be used for full-duplex operations with respect to UE 115a. As will be discussed in more detail below, full-duplex operations with respect to UE 115a may include receiving uplink transmissions from UE 115a while simultaneously transmitting downlink traffic to UEs 115b and 115c.

When the base station determines that the IC capabilities are insufficient to reduce the interference level on the uplink channels of a particular UE over a particular portion of the CC BW, the base station may determine that the particular portion of the CC BW may not be used for full-duplex operations with respect to the particular UE. For example, base station 105 may determine that the interference level on the uplink channel associated with UE 115a over BWP 701 due to simultaneous downlink transmission by base station 105 to UEs 115b and 115c over the same BWP 701 is greater than what the IC capabilities of base station 105 may be able to reduce. In some aspects, base station 105 may determine that in order to reduce the interference level a higher level of IC complexity may be required. The increase in complexity may be above a predetermined threshold, or may be higher than the complexity available at base station 105, in which case, base station 105 may determine that its IC capabilities may be insufficient to reduce the interference level on the uplink channel associated with UE 115a over BWP 701.

As described above, determining the portion or portions of the CC BW for full-duplex operations may include determining more than one portion for full-duplex operations. For example, in some aspects, the base station may determine that its IC capabilities are sufficient to reduce the interference level determined at more than one portion of the CC BW, with respect to one or more UEs. In this case, each of the portions may be identified and/or selected as BWP FD portions. Similarly, more than one UE may be identified for full-duplex operations. For example, the base station may determine that its IC capabilities are sufficient to reduce the interference level determined at least one portion of the CC BW with respect to more than one UE. In this case, each UE may be identified as a UE for full-duplex operations. Conversely, in aspects, the base station may also determine which UEs of the BWP FD UEs may not be used in full-duplex operations. For example, base stations 105 may determine that its IC capabilities are insufficient to reduce the interference level determined at any portion of the CC BW with respect to UE 115a. In this case, UE 115a may not be used in full-duplex operations by base station 105.

In aspects, the IC capabilities of the base station may include capabilities for dynamically reducing interference. This IC capabilities of the base station may be based on the uplink bandwidth. For example, as described above, the size of a BWP, and/or the overlap between the uplink and downlink over a BWP at the base station may determine and affect the hardware complexity necessary for a particular IC capability to reduce interference on the uplink of the BWP. The higher the size of the BWP and/or the overlap, the higher the complexity required for a particular level of IC capability.

In some aspects, the IC capabilities of a base station with respect to a UE may depend on the level of antenna isolation at the base station, the location of the UE with respect to the base station, which may affect a path-loss associated with the UE, an uplink transmission rate, and/or a downlink transmission power. For example, a higher antenna isolation, while increasing the hardware complexity, may also increase the IC capabilities of the base station. The location of a UE with respect to the base station may affect the path-loss of the communications. For example, a UE that is closer to a base station may have a small path-loss than a UE that is farther away from the base station. A UE with a smaller path-loss may take less IC to reduce interference, in which a larger BW may be used for BWP FD operations. In the case of a higher path-loss, more IC may be required, in which case a smaller BW may be used for BWP FD operations.

Decoding uplink data transmitted by a BWP UE at the base station may be done at a particular rate, based on the signal to interference and noise ratio (SINR) of the uplink signal. In some cases, increasing the decoding rate may entail increasing the uplink SINR. However, decoding data at a higher rate based on a higher uplink SINR may require a higher complexity. With limited IC capabilities, the SINR may also affect the IC capabilities of the base station, which may help the base station determine whether a BWP associated with an uplink of a UE may be suitable for BWP FD operations.

In aspects, the IC capabilities of a base station with respect to a particular BW may be expressed by equation (1) as follows:

$$\eta_{IC}(BW) \geq PTx_{DL} - Ant_{isolation} - PTx_{UL} + PL_{max} + SINR_{UL} \quad (1)$$

Where $PTx_{DL}$ refers to the downlink transmission power over the bandwidth at the base station, $Ant_{isolation}$ refers to the antenna isolation level at the base station, $PTx_{uL}$, refers to the transmit power of the uplink transmissions at the UE over the uplink bandwidth, $PL_{max}$ refers to the maximum path-loss supported by the IC capability, and $SINR_{UL}$ refers to the uplink SINR of uplink signals over the bandwidth.

In aspects, as the base station may be aware of the level of IC capabilities that the base station has, the base station may use that knowledge to determine the portion(s) of the CC BW for BW FD operations, according to aspects described above.

At block 606, the base station activates full-duplex operations for the portion(s) of the CC BW identified at block 605. For example, gNB 900 may execute, under control of controller/processor 240, BWP FD Activator 905, stored in memory 242. The execution environment of BWP FD Activator 905 provides the procedural steps for activating full-duplex operations for portion(s) of the CC BW. In aspects, activating full-duplex operations for the portion(s) of the CC BW may include enabling uplink reception, from at least one BWP FD UE, over the portion(s) identified for BWP FD operations while transmitting downlink traffic to at least one other UE over the same portion(s) of the CC BW. In aspects, the at least one BWP FD UE for which uplink reception may be enabled over the portion(s) may be one or more UEs identified at block 605. For example, as described above, and with respect to FIG. 7, base station 105 may determine that its IC capabilities are sufficient to reduce the interference on the uplink associated with UE 115*a* over BWP 701 due to simultaneous downlink transmission by base station 105 to UEs 115*b* and 115*c* over the same BWP 701. In this case, activating BWP 701 for full-duplex operations may include enabling base station 105 to receive uplink transmissions from UE 115*a* over BWP 701, while simultaneously transmitting downlink traffic to UEs 115*b* and 115*c* over BWP 701. For example, at symbols 723 of slot 720, uplink control data may be received from UE 115*a* over BWP 701, while at the same time downlink data may be transmitted to UEs 115*b* and 115*c* over the same BWP 701. In another example, uplink data, such as PUSCH, may be received from UE 115*a* over BWP 701 at symbols 734. Also at symbols 734, and over the same BWP 701 over which the PUSCH may be received, base station 105 may transmit downlink data to UEs 115*b* and 115*c*. These are BWP FD operations.

For example, UEs 115*a-c* may be UEs served by base station 105. In BWP FD operations, base station 105 may simultaneously receive uplink data from a first set of served UEs and transmit uplink data to a second set of served UEs. For example, UE 115*a* may comprise the first set of UEs while UEs 115*b* and 115*c* may comprise the second set of served UEs. In some embodiments, the first set of served UEs may have more than one UE. Likewise, the second set of served UEs may have more than or fewer than two UEs. For example, in some embodiments the first set of UEs may include only a single UE. Likewise, in some embodiments, the second set of UEs may include only a single UE.

In some aspects, an indication of the BWP(s) identified and/or selected for full-duplex operations may be sent to the UE(s) identified and/or selected for full-duplex operations over the selected BWP(s). In addition, the uplink data received over the BWP(s) identified for full-duplex operations may be indicated to the respective UE(s) by the base station using downlink control information. For example, base station 105, having identified BWP 701 as a BWP for full-duplex operations with UE 115*a* (e.g., based on SRS received at symbol 713 of slot 710), may send downlink control information, at symbols 721 of slot 720, to UE 115*a*. The downlink control information may include a downlink control information (DCI) message that may indicate the BWP(s) identified and/or selected for full-duplex operations, and the UE(s) identified and/or selected for full-duplex operations over the selected BWP(s). In aspects, the DCI message may be sent to all UEs served by the base station, to UEs identified as potential BWP FD UEs, and/or to UEs selected for BWP FD operations.

The DCI message may also include an indication of what data is to be sent by the UEs. For example, the DCI message sent to UE 115*a* at symbol 721 may indicate to UE 115*a* that, at symbol 723 of slot 720, UE 115*a* is to transmit a PUCCH including uplink control information over BWP 701. This PUCCH transmission may be received by base station 105 over BWP 701 at symbol 723, while the base station simultaneously transmits downlink data to UEs 115*b* and/or 115*c*. In some embodiments, a random access channel, such as a physical random access channel (PRACH) may be transmitted by UE 115*a* and received by the base station 105, while the base station 105 simultaneously transmits downlink data to UEs 115*b* and/or 115*c*. In aspects, the DCI message may also be sent to UEs 115*b* and/or 115*c* and may include an indication and/or a grant to UEs 115*b* and/or 115*c* to receive downlink data at symbol 723 of slot 720 over BWP 701. It is noted that the indication to UEs 115*b* and/or 115*c* may not include a specify reference to BWP 701, but may instead include a grant to receive downlink data from base station 105 at any portion of the CC BW that overlaps BWP 701, or the entire CC BW.

In another example, the DCI message sent to UE 115*a* at symbol 721, or another DCI message sent to UE 115*a* at symbol 731 of slot 730, may indicate to UE 115*a* that, at symbols 734 of slot 730, UE 115*a* is to transmit a PUSCH including uplink data over BWP 701. The DCI message may alternatively or additionally indicate to UE 115*a* to transmit PUCCH at symbol 733 of slot 730 over BWP 701. In aspects, the PUSCH to be transmitted at symbols 734 may include a low rate uplink transmission. It is noted that, the low rate transmission from the UE may have been identified at block 605, or may be signaled by the UE to the base station, which may be reason the UE may have been selected for BWP FD operations. The PUSCH transmission may be received by base station 105 over BWP 701 at symbols 734, while the base station simultaneously transmits downlink data to UEs 115*b* and/or 115*c* over BWP 701.

In some aspects, the specific arrangement of the full-duplex BWP(s) within the CC BW may vary. For example, FIG. 7 shows an arrangement in which the full-duplex BWP, e.g., BWP 701, spans a center portion of CC BW 700, and in which the uplink BW is smaller than the downlink BW. However, in aspects, the full-duplex BWP may not be located in the center of the CC BW, and/or the uplink BW may not be smaller than the downlink BW. In these aspects, the full-duplex BWP span may be located at any point along the CC BW, and/or the uplink BW may be the same, or greater than the downlink BW.

Figure 8A:
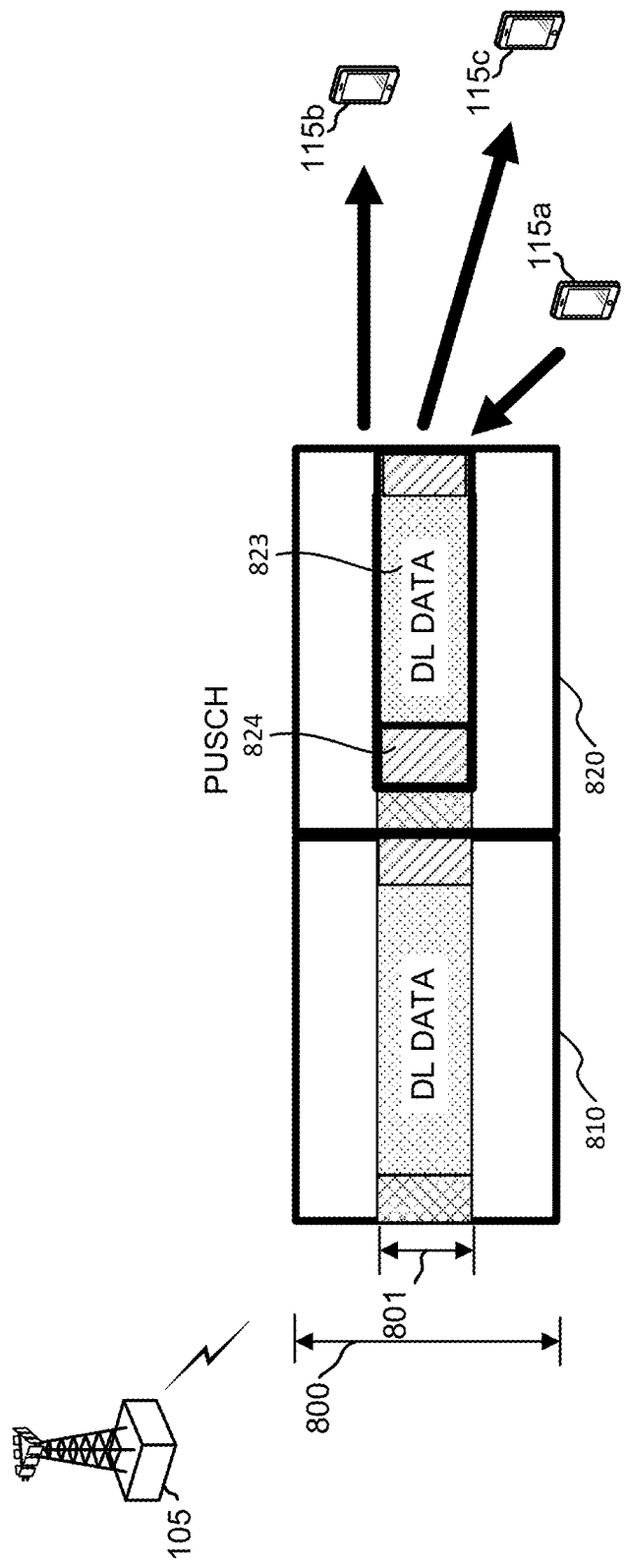
FIG. 8A is a block diagram illustrating an example of a BWP FD configuration in accordance with embodiments of the present disclosure.
Figure 8B:
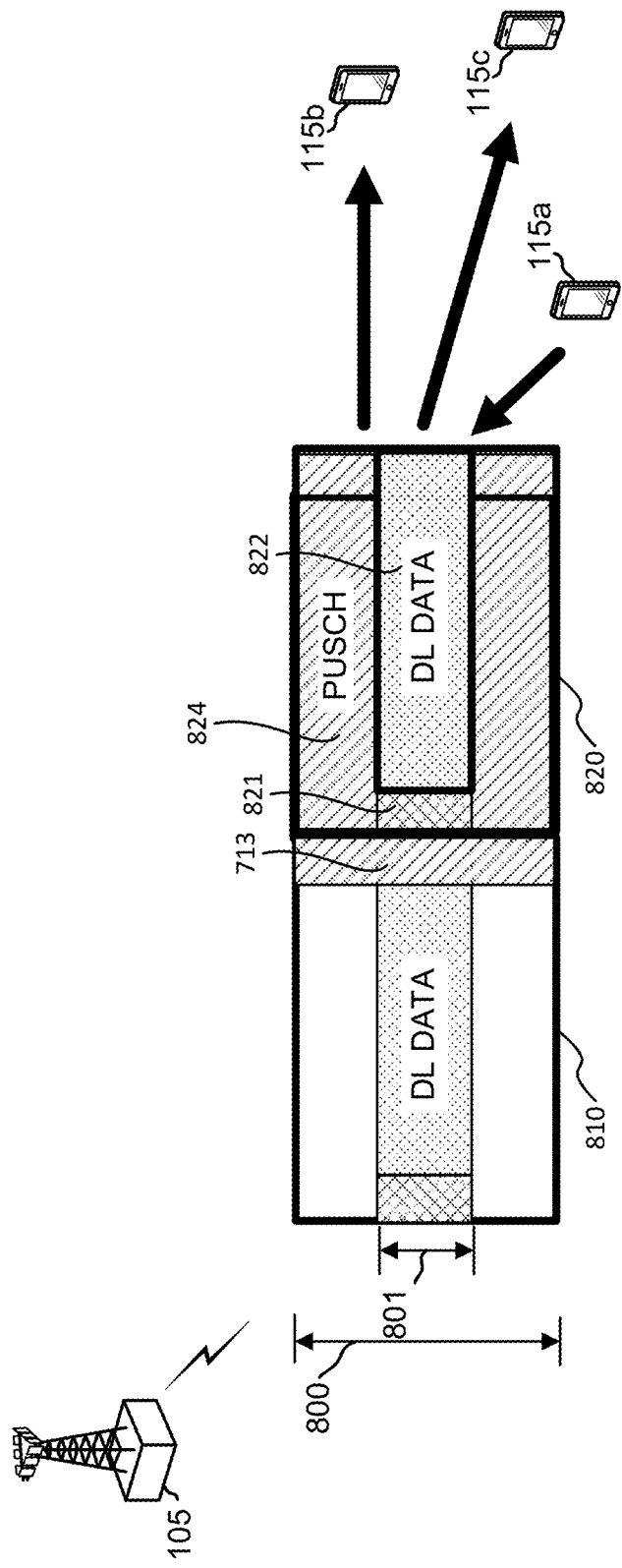
FIG. 8B is another block diagram illustrating an example of a BWP FD configuration in accordance with embodiments of the present disclosure.
Figure 8C:
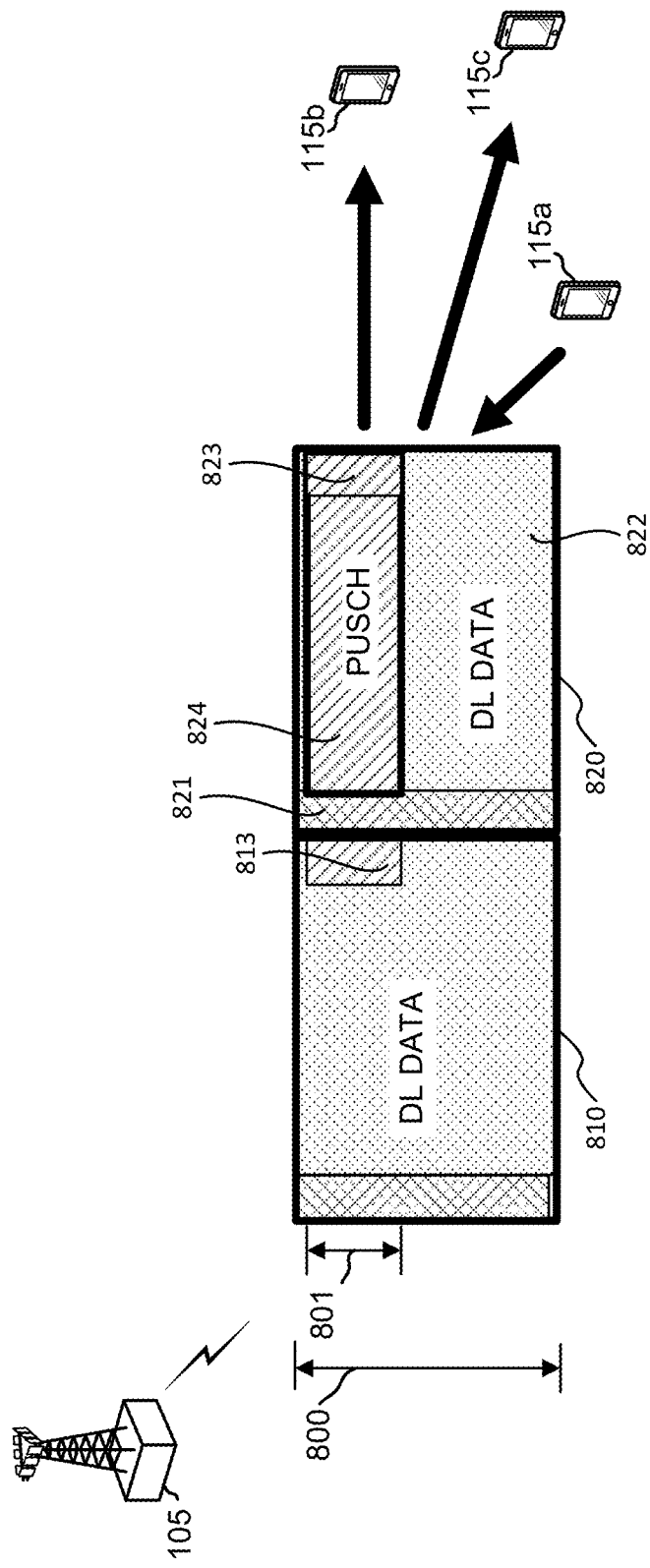
FIG. 8C is yet another block diagram illustrating an example of a BWP FD configuration in accordance with embodiments of the present disclosure.

For example, FIGS. 8A-C show several block diagrams illustrating various example of BWP FD configurations in accordance with embodiments of the present disclosure. As shown in FIG. 8A, full-duplex BWP 801 may include an uplink BW where PUSCH (e.g., low rate PUSCH) may be received at symbols 824 of slot 820, that may span the same BW as the downlink BW over which downlink data may be transmitted at symbols 823. In this example, neither the uplink BW nor the downlink BW span the entirety of CC BW 800. FIG. 8B illustrates an example in which the downlink bandwidth portion of CC BW 800 may span BWP 801. The uplink portion of CC BW 800 may span the entirety of CC BW 800. In this example, BWP 801 may be identified and selected as the BWP for full-duplex operations. Thus, in this case, the uplink BW is larger than the downlink BW. It is noted that varying the BW of the downlink and uplink components of the CC BW may facilitate a level of isolation, e.g., by providing a guard band at the band's edge, and may improve coexistence with adjacent channels. It is again noted that the size or span of the full-duplex BWP may be determined by the base station based on the interference at the uplink channels of potential BWP FD UEs and based on the IC capabilities of the base station. As such, the specific arrangement of the full-duplex BWP within the CC BW may vary accordingly.

At block 607, the UE may receive, from the base station, downlink control information including an indication of at least one portion of the CC BW activated for full-duplex operations between the base station and the UE. For example, UE 1000 may receive, via wireless radios 1001a-r and antennas 252a-r, a DCI message including an indication of a portion or portions of the CC BW activated for full-duplex operations between base station 900 and UE 1000. In aspects, The DCI message may also include an indication of what data is to be sent by the UEs, as described above. At block 608, the UE transmits uplink traffic to the base station over the at least one portion of the CC BW in accordance with the downlink control information received at block 607. For example, with reference to FIG. 7, UE 115a may transmit PUSCH to base station 105 over BWP 701 at symbols 734 of slot 730 according to the downlink information received at symbol 721 or 731. In aspects, the uplink traffic may be transmitted by the UE, and/or received by the base station from the UE, while the base station simultaneously transmits downlink information to at least one other UE over the same BWP of the CC BW. For example, while UE 115a transmits PUSCH over BWP 701 at symbols 734 of slot 730 to base station 105, base station 105 may simultaneously receive the PUSCH from UE 115a and transmit downlink data to UEs 115b and 115c at symbols 734 of slot 730 over BWP 701.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the logical blocks in FIGS. 6A and 6B described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    receiving, by a base station serving a plurality of user equipments (UEs) over a component carrier bandwidth (CC BW), at least one reference signal from a first set of UEs of the plurality of UEs, wherein the reference signal is received while the base station is transmitting downlink traffic to a second set of UEs of the plurality of UEs over at least a part of the CC BW;
    determining, based on the reference signal, a level of interference on transmissions between the base station and the first set of UEs over the at least a part of the CC BW;
    determining, based at least in part on interference cancelation capabilities of the base station and the determined level of interference, at least one portion of the CC BW for full- duplex operations; and
    activating full-duplex operations for the at least one portion of the CC BW, wherein activating full-duplex operations for the at least one portion of the CC BW includes enabling uplink reception from the first set of UEs over the at least one portion of the CC BW while transmitting downlink traffic to the second set of UEs over the at least one portion of the CC BW.

2. The method of claim 1, wherein the at least one reference signal includes a sounding reference signal (SRS) received from each UE of the first set of UEs, and wherein each UE of the first set of UEs is configured to generate the SRS by wideband sounding across one or more ports of the UE.

3. The method of claim 1, wherein full-duplex operations include:
    receiving at least one of uplink control information, an uplink random access channel, or uplink data from at least one UE of the first set of UEs; and
    transmitting at least one of downlink control information and downlink data to at least one UE of the second set of UEs.

4. The method of claim 1, wherein the interference cancelation capabilities of the base station are based on at least one of:
    a full-duplex bandwidth within the CC BW; or
    a full-duplex interference cancelation requirement.

5. The method of claim 4, wherein the full-duplex bandwidth within the CC BW is an overlapped bandwidth of the downlink transmission bandwidth and the uplink reception bandwidth at the base station.

6. The method of claim 4, wherein the full-duplex interference cancelation requirement is based on a downlink transmit power, an uplink transmit power, an isolation between the antennas of the base station, a target uplink signal to interference and noise ratio ($SINR_{UL}$), and a path-loss (PL) of at least one UE of the second set of UEs.

7. The method of claim 1, wherein the first set of UEs includes multiple UEs, and wherein the determining the at least one portion of the CC BW for full-duplex operations includes one of:
    determining a different portion of the CC BW for full-duplex operations for each UE of the first set of UEs; or
    determining a single portion of the CC BW for full-duplex operations for at least two UEs of the first set of UEs.

8. The method of claim 1, wherein the transmitting downlink traffic to the second set of UEs over the at least one portion of the CC BW includes transmitting downlink traffic in an equal, smaller, or larger portion of the at least one portion of the CC BW over which uplink traffic is received from the first set of UEs.

9. The method of claim 1, wherein the at least one portion of the CC BW is one of:
    centered on the CC BW;
    at one of the edges of the CC BW; or
    defined by one or more sets of contiguous Resource Block (RB) allocations based on an index of a first RB and a number of the RBs in the set.

10. A method of wireless communication, comprising:
    receiving, by a user equipment (UE), from a base station serving a plurality of UEs including the UE over a component carrier bandwidth (CC BW), a request for a reference signal;
    generating, by the UE, the reference signal to be received by the base station while the base station is transmitting downlink traffic to at least one other UE of the plurality of UEs over at least a part of the CC BW;
    receiving, from the base station, downlink control information including an indication of at least one portion of the CC BW activated for full-duplex operations between the base station and the UE; and
    transmitting, by the UE, uplink traffic to the base station over the at least one portion of the CC BW, wherein the uplink traffic from the UE is received by the base station while the base station simultaneously transmits downlink information to at least one other UE over the at least one portion of the CC BW.

11. The method of claim 10, wherein the requested reference signal is a sounding reference signal (SRS), and wherein the generation of the SRS includes performing a wideband sounding across one or more ports of the UE.

12. The method of claim 10, wherein the UE is configured for half-duplex operations.

13. The method of claim 10, wherein the indication of the at least one portion of the CC BW activated for full-duplex operations between the base station and the UE is based on interference cancelation capabilities of the base station.

14. An apparatus configured for wireless communication, comprising:
    means for receiving, by a base station serving a plurality of user equipments (UEs) over a component carrier bandwidth (CC BW), at least one reference signal from a first set of UEs of the plurality of UEs, wherein the reference signal is received while the base station is transmitting downlink traffic to a second set of UEs of the plurality of UEs over at least a part of the CC BW;

means for determining, based on the reference signal, a level of interference on transmissions between the base station and the first set of UEs over the at least a part of the CC BW;

means for determining, based at least in part on interference cancelation capabilities of the base station and the determined level of interference, at least one portion of the CC BW for full-duplex operations; and means for activating full-duplex operations for the at least one portion of the CC BW, wherein the means for activating full-duplex operations for the at least one portion of the CC BW includes means for enabling uplink reception from the first set of UEs over the at least one portion of the CC BW while transmitting downlink traffic to the second set of UEs over the at least one portion of the CC BW.

15. The apparatus of claim 14, wherein the at least one reference signal includes a sounding reference signal (SRS) received from each UE of the first set of UEs, and wherein each UE of the first set of UEs is configured to generate the SRS by wideband sounding across one or more ports of the UE.

16. The apparatus of claim 14, wherein full-duplex operations include:
receiving at least one of uplink control information, an uplink random access channel, or uplink data from at least one UE of the first set of UEs; and
transmitting at least one of downlink control information and downlink data to at least one UE of the second set of UEs.

17. The apparatus of claim 14, wherein the interference cancelation capabilities of the base station are based on at least one of:
a full-duplex bandwidth within the CC BW; or
a full-duplex interference cancelation requirement.

18. The apparatus of claim 17, wherein the full-duplex bandwidth within the CC BW is an overlapped bandwidth of the downlink transmission bandwidth and the uplink reception bandwidth at the base station.

19. The apparatus of claim 14, wherein the first set of UEs includes multiple UEs, and wherein the means for determining the at least one portion of the CC BW for full-duplex operations includes means for one of:
determining a different portion of the CC BW for full-duplex operations for each UE of the first set of UEs; or
determining a single portion of the CC BW for full-duplex operations for at least two UEs of the first set of UEs.

20. The apparatus of claim 14, wherein the means for transmitting downlink traffic to the second set of UEs over the at least one portion of the CC BW include means for transmitting downlink traffic in an equal, smaller, or larger portion of the at least one portion of the CC BW over which uplink traffic is received from the first set of UEs.

21. The apparatus of claim 14, wherein the at least one portion of the CC BW is one of:
centered on the CC BW;
at one of the edges of the CC BW; or
defined by one or more sets of contiguous Resource Block (RB) allocations based on an index of a first RB and a number of the RBs in the set.

22. An apparatus configured for wireless communication, the apparatus comprising:
at least one processor; and
a memory coupled to the at least one processor,
wherein the at least one processor is configured to:
receive, by a base station serving a plurality of user equipments (UEs) over a component carrier bandwidth (CC BW), at least one reference signal from a first set of UEs of the plurality of UEs, wherein the reference signal is received while the base station is transmitting downlink traffic to a second set of UEs of the plurality of UEs over at least a part of the CC BW;
determine, based on the reference signal, a level of interference on transmissions between the base station and the first set of UEs over the at least a part of the CC BW;
determine, based at least in part on interference cancelation capabilities of the base station and the determined level of interference, at least one portion of the CC BW for full- duplex operations; and
activate full-duplex operations for the at least one portion of the CC BW, wherein activating full-duplex operations for the at least one portion of the CC BW includes enabling uplink reception from the first set of UEs over the at least one portion of the CC BW while transmitting downlink traffic to the second set of UEs over the at least one portion of the CC BW.

23. The apparatus of claim 22, wherein the reference signal is a sounding reference signal (SRS) received from each UE of the at least one UE, and wherein each UE of the first set of UEs is configured to generate the SRS by wideband sounding across one or more ports of the UE.

24. The apparatus of claim 22, wherein full-duplex operations include:
receiving at least one of uplink control information, an uplink random access channel, or uplink data from at least one UE of the first set of UEs; and
transmitting at least one of downlink control information and downlink data to at least one UE of the second set of UEs.

25. The apparatus of claim 22, wherein the interference cancelation capabilities of the base station are based on at least one of:
a full-duplex bandwidth within the CC BW; or
a full-duplex interference cancelation requirement.

26. The apparatus of claim 25, wherein the full-duplex bandwidth within the CC BW is an overlapped bandwidth of the downlink transmission bandwidth and the uplink reception bandwidth at the base station.

27. The apparatus of claim 25, wherein the full-duplex interference cancelation requirement is based on a downlink transmit power, an uplink transmit power, an isolation between the antennas of the base station, a target uplink signal to interference and noise ratio ($SINR_{UL}$), and a path-loss (PL) of at least one UE of the second set of UEs.

28. The apparatus of claim 22, wherein the first set of UEs includes multiple UEs, and wherein the configuration of the at least one processor to determine the at least one portion of the CC BW for full-duplex operations includes configuration of the at least one processor to one of:
determine a different portion of the CC BW for full-duplex operations for each UE of the first set of UEs; or
determine a single portion of the CC BW for full-duplex operations for at least two UEs of the first set of UEs.

29. The apparatus of claim 22, wherein the configuration of the at least one processor to transmit downlink traffic to the second set of UEs over the at least one portion of the CC BW includes configuration of the at least one processor to transmit downlink traffic in an equal, smaller, or larger portion of the at least one portion of the CC BW over which uplink traffic is received from the first set of UEs.

30. The apparatus of claim 22, wherein the at least one portion of the CC BW is one of:
- centered on the CC BW;
- at one of the edges of the CC BW; or
- defined by one or more sets of contiguous Resource Block (RB) allocations based on an index of a first RB and a number of the RBs in the set.

* * * * *